May 1, 1956   O. D. SCARBOROUGH   2,744,236
CONTINUITY TESTER FOR ROCKET MOTORS
Filed June 18, 1954   2 Sheets-Sheet 1
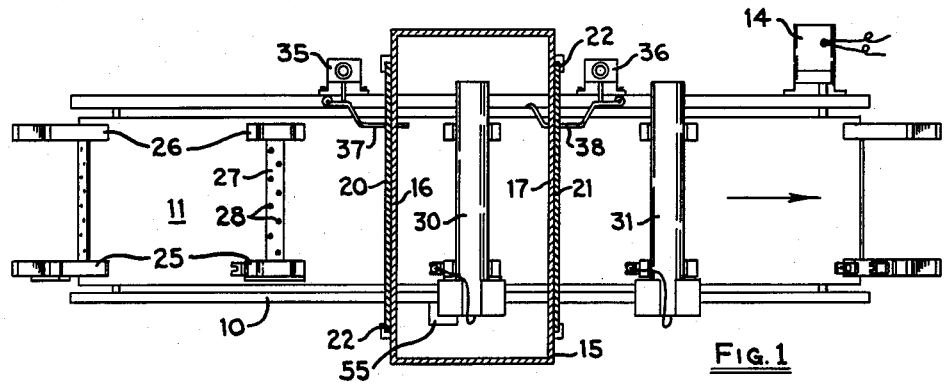
FIG. 1
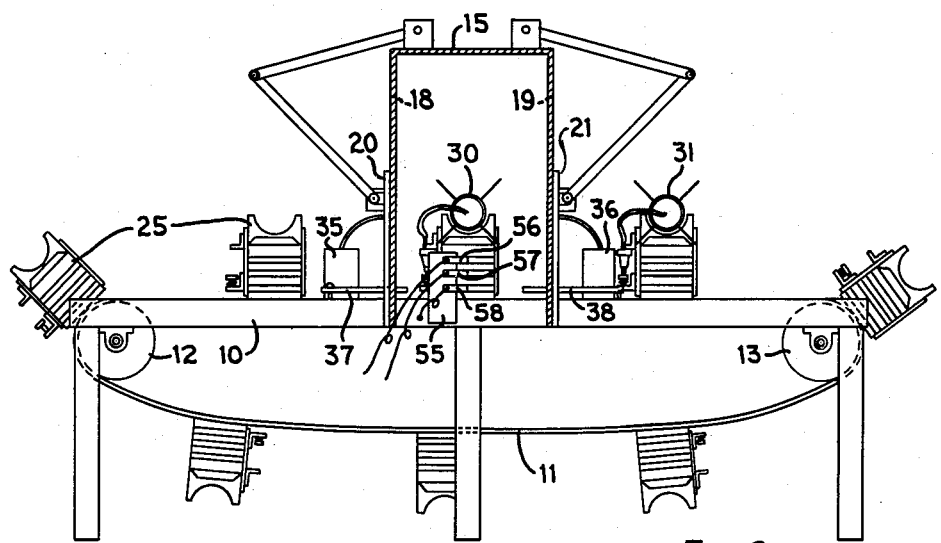
FIG. 2
FIG. 4
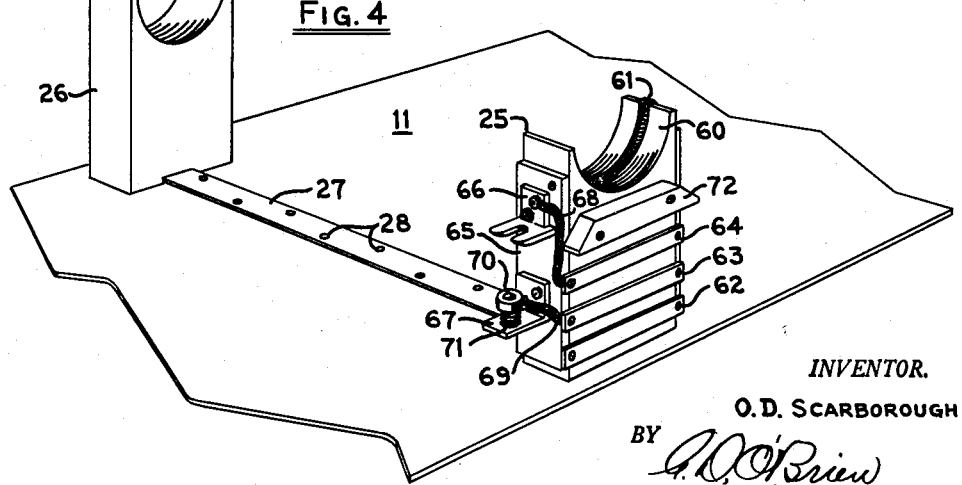
INVENTOR.
O. D. SCARBOROUGH
BY
ATTYS

INVENTOR.
O. D. SCARBOROUGH
BY
ATTYS.

United States Patent Office 2,744,236
Patented May 1, 1956

2,744,236

CONTINUITY TESTER FOR ROCKET MOTORS

O. D. Scarborough, Hastings, Nebr., assignor to the United States of America as represented by the Secretary of the Navy Application June 18, 1954, Serial No. 437,896

6 Claims. (Cl. 324—51)

(Granted under Title 35, U. S. Code (1952), sec. 266)

The invention described herein may be manufactured and used by or for the Government of the United States of America for governmental purposes without the payment of any royalties thereon or therefor.

This invention relates to a device for automatically testing in succession the electrical detonating circuit of each of a plurality of rocket motors under conditions of personal safety of attending personnel.

It has been a general practice, and it is believed to be the only known practice, of testing the ignition circuit of rocket motors to manually place the motors, one at a time, in a testing chamber. This operation requires the operator or attendant of the test to make some three or four electrical connections in the chamber before the test and to disconnect these connections after each test. After making the electrical connections the attendant must leave the chamber, secure it, throw the proper switches and take readings, return to the chamber, and manually remove the rocket motor after disconnecting it to make ready for the next test. All of these operations are time consuming and not without danger of a faulty rocket electrical system causing ignition of the squib in the rocket motor while the attendant is electrically connecting it whereupon injury to the attendant and damage to the chamber and surroundings is likely to follow.

In the present invention the rocket motors are placed on a conveyer and the detonator circuit established to electrical wiper strips on the rocket conveyor. The conveyor carries each rocket motor in its turn into a test chamber which is automatically opened and secured for each rocket tested. While each rocket motor is traveling through the test chamber, electrical brushes automatically connect the wiper strips to set up the proper electrical test circuits for providing indications of the continuity of the detonator circuits at a remote point. Each rocket motor is also automatically discharged of any static electricity coincident to the continuity measurements. Since the rocket motors are placed on a conveyor remote from the test chamber, there can be no danger of personal injury of an attendant in that an actual electrical potential is not applied to test the electrical continuity of the igniter system until the electrical brush and wiper strips make contact within the test chamber. It is therefore a general object of this invention to provide a method and means for testing the electrical continuity of the ignition system automatically of a plurality of rocket motors wherein the test indicators and all manual handling of the rocket motors are remote from the test chamber.

Other objects, advantages, features and uses will become more apparent as the description proceeds when taken in consideration of the accompanying drawings, in which:

Fig. 1 is an illustration of a top plan view of the test chamber and conveyor with a section of the test chamber removed to show a rocket motor therein;

Fig. 2 is an illustration of a side elevation of the device shown in Fig. 1 with an end section of the test chamber removed to show the rocket motor therein;

Fig. 4 is an isometric view of one of the rocket motor carriers on the conveyor.

Figure 3:
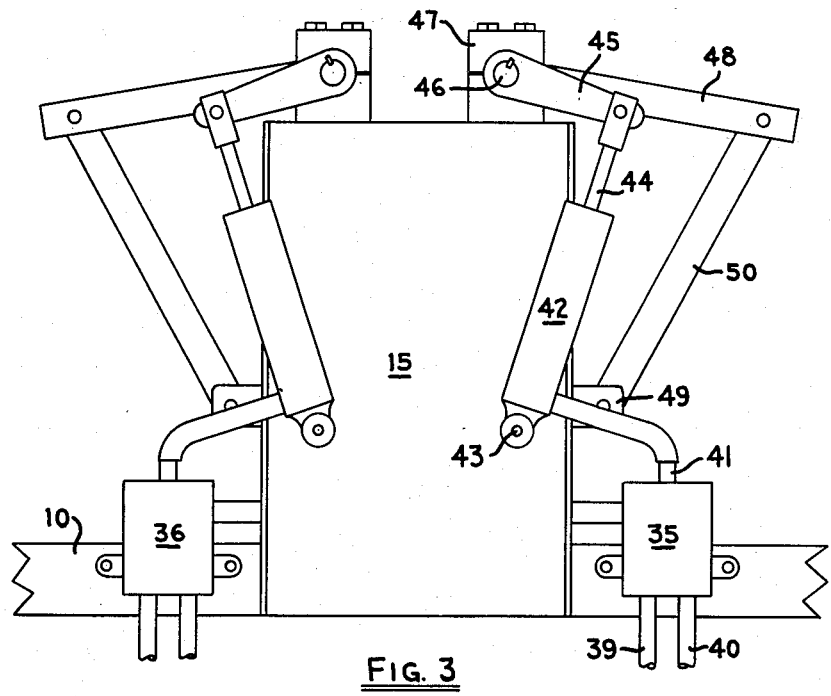
Fig. 3 is an illustration of an end elevational view of the test chamber with parts of the conveyor broken away.

Referring more particularly to Figs. 1, 2 and 3, there is shown a conveyor frame 10 supporting a conveyor belt 11 which is driven over rollers 12 and 13 at opposite ends of the conveyor frame. One of the rollers, as 13, is driven by a power means illustrated as a motor 14 through gear reduction means or the like. Supported on the frame 10 is a chamber 15 having heavy iron plate walls. The two walls 16 and 17 have openings 18 and 19, respectively, therein to permit rocket motors to be conveyed in and out of the chamber. These openings are closable by heavy iron plate doors 20 and 21, respectively, that are slidable up and down in slide channels 22. The actuators for these slidable doors will be described below.

On the conveyor belt 11 are a plurality of spaced apart rocket motor carriers consisting of two upstanding end supports 25 and 26 fixed to a spacer cross-member 27. The cross-member 27 is fixed to the conveyor belt 11 as by rivets 28, or in any other suitable manner. The conveyor belt 11 is illustrated to travel in the direction of the arrow herein although the device could be readily adapted to operate in either direction, as desired. As illustrated, rocket motors are cradled on the carriers which have the end supports 25 and 26 cut out forming a semi-circular trough to just nestle the rocket motor therein, as will later be more fully described. Two such rocket motors 30 and 31 are shown in position on their respective carriers, the rocket motor 30 being in the chamber 15 ready for a continuity test as will later be described.

On the frame 10 are mounted two fluid valves 35 and 36, one on each side of the chamber 15. Each valve has an actuator rod for controlling the fluid valve, as is well understood in the art, the actuator rod being actuated by a cam-shaped lever pivoted to the frame. The valve 35 has the cammed lever 37 and the valve 36 has the cammed lever 38 related, respectively, such that the passing of the support member 26 of each carrier will actuate these levers. As more particularly seen in Fig. 3, each fluid valve has a supply conduit 39 and an exhaust conduit 40 controlled to a motor conduit 41. The motor conduit 41 is connected by a flexible pipe to a fluid motor 42 pivoted to the chamber wall at 43. The fluid motor actuating rod 44 is pivotally connected to a lever arm 45 fixed to a shaft 46. The shaft 46 is journaled in supports 47 on the top chamber 15 wall. Centrally of the shaft 46 is fixed another lever arm 48 that extends outwardly over the chamber door 20. The chamber door 20 has an outstanding lug 49 thereon pivotally coupled to the lever arm 48 through a link 50. Since the door 21 is operated in the same manner as the door 20, specific reference to the parts and elements associated with valve 36 and door 21 will not be made herein. It is now believed apparent that the travel of any carrier toward the chamber 15 will cause the door 20 to open when the support member 26 passes along the cammed lever 37 to the inside of the chamber, the door 20 closing behind the carrier when 26 passes off the lever 37. The door 21 is opened and closed in the same manner to permit the carrier to pass out of the chamber 15. It is to be understood that the means shown and described for operating the doors 20 and 21 is illustrative only and that many different practical modifications of automatic fluid or electric operators may be utilized.

Within the chamber 15 and fixed as to the frame 10 is an electrical brush holder 55 having three spring brushes 56, 57, and 58 thereon extending inwardly to pass over the outer face of each support member 25 for the purpose soon to be made clear. The brushes 56 and 57 are connectible by electrical conductors to an electrical potential source through a meter, as a vacuum tube ohmmeter or the like (not shown), at some remote point. The brush 58 is connected to ground.

Figure 5:
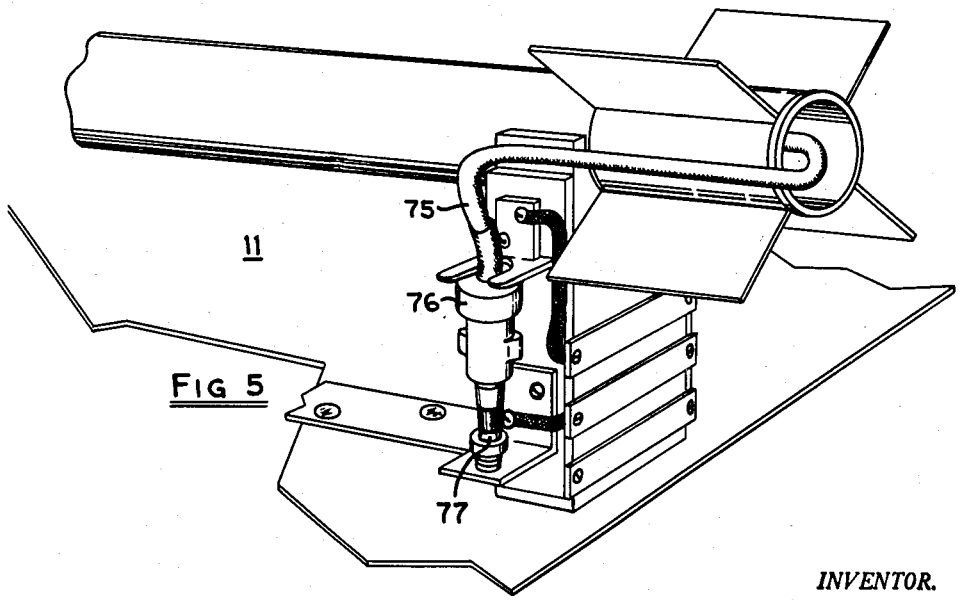
Fig. 5 is an isometric view of a part of the carrier with a part of the rocket motor shown thereon.

Referring more particularly to Figs. 4 and 5, the structure of the rocket motor carrier is shown with and without a rocket motor cradled therein. The top of the support member 25 has a semicircular groove 60 therein in line with a similar groove in the top of the support member 26. Lying around this groove 60 is a woven electrical conductive strap 61 which is connected to the lowermost of three electrically conductive wiper strips 62, 63, and 64 fixed to the outer side of the support member 25. The support member 25 is preferably of an electrically non-conductive material as wood, or the like, but it is preferable to place an electrical insulator under each wiper strip. On one edge of the member 25 is a thick electrical insulator block 65 on which is mounted two angle brackets 66 and 67. The angle bracket 66 has the outstanding portion bifurcated and it is electrically connected by a strap conductor 68 to the top wiper strip 64. The angle bracket 67 is electrically connected by a conductive strap 69 to the central wiper strip 63 and has an upstanding electrical contact 70 biased upwardly by a spring 71. On the outer face of the member 25 is a transverse element 72 having downward angles on opposite ends thereof to position the tail fins of the rocket motor at angles in which they will pass through the doors 20 and 21.

Referring now to Fig. 5, the tail portion of a socket motor is shown resting in the groove 60. The two conductors 75 to the squib (not shown) within the rocket motor has a coupling member 76 on the end thereof with one conductor connected to the casing of the coupling member and the other connected to the contact 77 at the lower tip of the coupling member. To connect the squib of the rocket motor electrically to the wiper strips 63 and 64 it is only necessary to push the coupling member 76 downwardly with the contact 77 against the contact 70 depressing the spring 71 until the top of the coupling member slides under the bifurcated portion of the angle bracket 66. The contacts 70 and 77 preferably have conical or spherical interfitting portions to hold them aligned. The body of the rocket motor is electrically connected to the wiper strip 62 by the strap conductor 61.

In the operation of the device rocket motors are placed on the carriers in advance of the chamber 15, two of such rocket motors 30 and 31 being shown on carriers for the purpose of example. For the purpose of a simple illustration, Figs. 1 and 2 are shown with just two carriers anterior and two carriers posterior to the test chamber 15 but it is to be understood that the conveyor can be increased in length, and in practice is, to permit several rocket motors to be conveyed before and aft of the test chamber thereby enabling attendants to place and remove the rocket motors far from the danger zone of the test chamber. As the rocket motors are placed on the carriers, the electrical couplings are thrust into position as shown in Fig. 5. The rocket motors are not thereafter touched until they have passed through the test chamber and are far on the exit side. The rocket motors can be placed on and removed from the carriers while the conveyor is moving and while actual continuity tests are progressing of rocket motors passing through the test chamber. As a rocket motor carrier approaches the test chamber the support member 26 actuates the valve lever 37 to open the door long enough for the rocket motor to get inside the test chamber. The rocket carriers may be spaced so that one rocket motor is passing out through the door 21 as another is passing in through the door 20. Once a rocket motor carrier is inside the test chamber 15 both doors are closed and continuing conveyance along its path will bring all three wiper strips 64, 63, and 62 into electrical contact with the brushes 56, 57, and 58, respectively. During the time that the wiper strips are passing along in contact with the brushes, the attendant remote from the chamber can get readings of resistance, or the like, of the circuit through the squib or detonator. The potential used for testing purposes is far below that needed for activation of the squib or detonator. Ohmmeter readings or the like will show if there is a broken connection or an electrical short. Simultaneously with this meter reading operation the rocket motor is grounded of any static electricity which might otherwise interfere with the test. In the event any squib or detonator is set off it will burn itself out within the chamber 15 where no one will be harmed. The attendant at the meter may have control of the motor circuit to motor 14 to stop the conveyor in emergencies and he may also have a communication system with attendants removing the rocket motors to bring to their attention any faulty squib circuits. The rockets motors may be temporarily numbered to expedite the testing procedure. The wiper strips and brushes function automatically as a switch means to switch the squib circuit on for a short period. In all off switch periods the rocket motor is harmless. In the above manner a plurality of rocket motors can be tested in rapid sequence without placing attending personnel in positions of peril.

While many modifications and changes may be made in constructional details and features of this invention as shown and described herein for a preferred embodiment thereof without departing from the spirit and scope of the inventive concept, it is to be understood that I desire to be limited only in the scope of the appended claims.

I claim:

1. An automatic electrical continuity tester of electrical detonating circuits comprising, means for conveying detonator circuits across an area unattended, means connecting the leads of each detonator circuit to one component of an electrical switching means, an explosion confining chamber over a portion of said first-mentioned means with automatic means controlled by said means for conveying detonator circuits for admitting and discharging the detonator circuits into and out of said chamber, and a companion component of the electrical switching means in said chamber for switching a test current through a detonator circuit passing through said chamber whereby a plurality of detonator circuits can be rapidly tested consecutively with attendant personnel at remote points.

2. An automatic electrical continuity tester for squib detonators of rocket motors comprising; a conveyor belt having a plurality of pairs of upstanding support cradle members each to cradle a rocket motor transversely of said belt, each carrier having electrical wiper strips on the outer face of the corresponding cradle member of each pair adapted to be coupled to the squib detonator of a carried rocket motor; and a test chamber enclosing a portion of said conveyor, said test chamber having entrance and exit doors for admitting and discharging conveyed rocket motors with fluid motors coupled thereto and controlled by fluid valves actuatable by the corresponding cradle member of each pair of carriers to open and close said doors, and said test chamber further having contact means therein connectible to remote instruments and adapted to contact said electrical wiper strips on said carriers whereby rocket motor squib detonators may be tested at safe distances by attendant personnel.

3. An automatic electrical continuity tester for electrical detonating circuits comprising, a conveyor, means equidistantly spaced along said conveyor for carrying elements having detonating circuits therein, electrical wiper strip means parallel to the direction of motion of said conveyor fixed to each carrying means, one wiper strip adapted to electrically connect the element being carried and two wiper strips adapted to be connected to each lead of a detonating circuit being carried, a test chamber enclosing a portion of said conveyor having doors for admitting and discharging each carrying means in consecutive order as they are carried along by said conveyor, said doors being powered to open and close with said power being controlled by switchable means actuatable by each carrying means, and electrical brushes in the path of said wiper strips for making electrical contact for a period of time that the carrying means advances through said chamber whereby the detonator circuits in elements incorporating them can be tested speedily and automatically from remote points exteriorally of said test chamber.

4. An automatic electrical continuity tester as set forth in claim 3 wherein said means equidistantly spaced along said conveyor each consists of a pair of upstanding supporting members having an arcuate aligned channel therein for cradling an element with a detonating circuit, said wiper strips are fixed to the outer face of the corresponding supporting member of each pair, the one said wiper strip being connectible to any carried element by a conductor lying in the arcuate channel and connected to said one wiper strip, and said two wiper strips adapted to be connected to each lead of a detonating circuit consists of connecting said two wiper strips to one element of an electrical connector fixed to said supporting member adapted to receive the companion connector on said detonator leads.

5. An automatic electrical continuity tester for squib detonators of rocket motors comprising; an explosion proof test chamber; a conveyor belt passing through said test chamber; rocket motor carriers spaced along said conveyor belt; doors in said chamber over said conveyor belt operable by fluid means under the control of valve means actuatable by said carriers to admit and discharge said carriers to and from said chamber in consecutive order as the conveyor belt passes through said chamber; three electrical wiper strips on the corresponding face of each carrier one of which is connectible to a grounding lead on said carrier and two of which are connected to one component of a coupling connector on said carrier, said one component of a coupling connector being adapted to receive the companion coupling connector of rocket motor squib detonator leads; and three electrically conductive brushes within said chamber adapted to electrically contact the three wiper strips of each carrier as it passes through said chamber, said brush adapted to contact said wiper strip connectible to a grounding lead being connected to ground and the other two said brushes adapted to be connected through an electrical potential and measuring circuits whereby rocket motors placed on said carriers with the companion squib circuit coupling connectors coupled places the squib detonator circuit in a test condition for a short period of time while passing through said test chamber.

6. An automatic electrical continuity tester as set forth in claim 5 wherein said rocket motor carriers each comprises of a pair of upstanding support members in alignment across said conveyor belt, each having an arcuate cut-out portion in the top thereof and in alignment with the other of the pair, the corresponding support member of each pair being operable to actuate said door actuating means, and the other corresponding support member of each pair carrying said wiper strips.

References Cited in the file of this patent
UNITED STATES PATENTS

| | | |
|---|---|---|
| 1,842,810 | Whelchel | Jan. 26, 1932 |
| 1,960,231 | Cooper | May 29, 1934 |
| 2,417,488 | Handforth et al. | Mar. 18, 1947 |
| 2,543,754 | Beach | Mar. 6, 1951 |
| 2,543,803 | Prescott | Mar. 6, 1951 |
| 2,571,643 | Youhouse | Oct. 16, 1951 |